Aug. 19, 1941.　　W. H. STIRES　　2,253,448
CHAIN DREDGE BUCKET
Filed Sept. 14, 1940　　2 Sheets-Sheet 1

Inventor:
William H. Stires,
by Jas. H. Richmond
Attorney.

Aug. 19, 1941.    W. H. STIRES    2,253,448
CHAIN DREDGE BUCKET
Filed Sept. 14, 1940    2 Sheets-Sheet 2
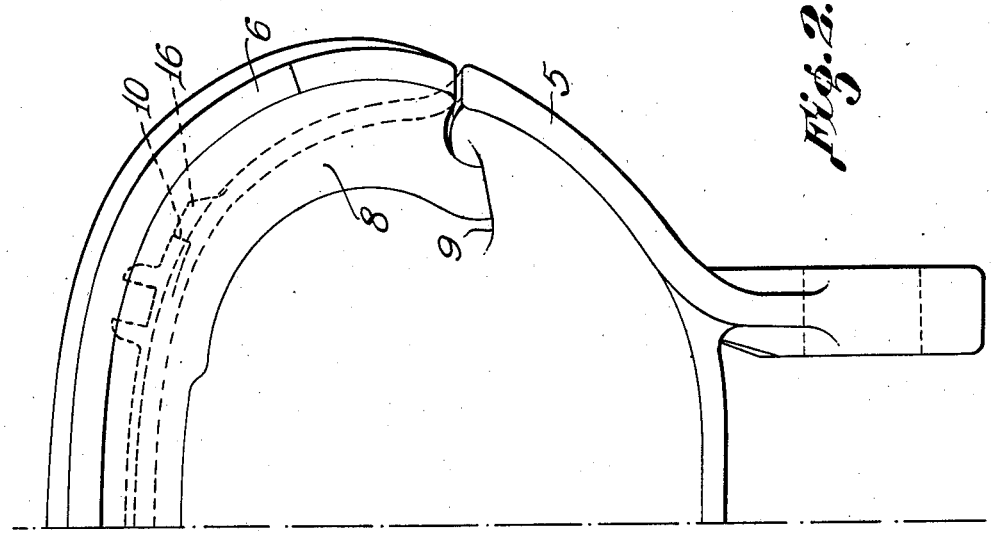
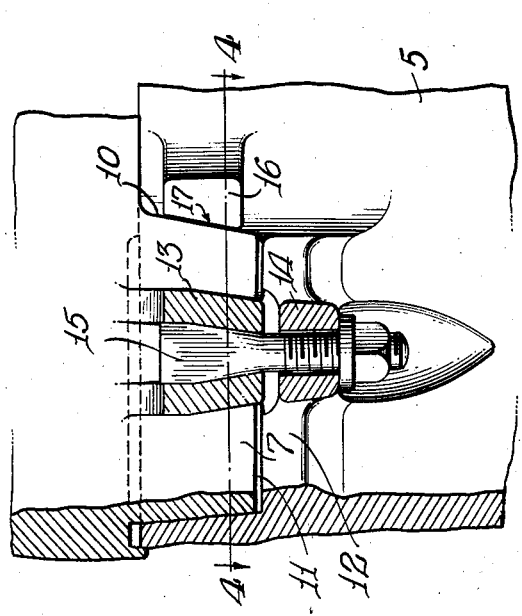
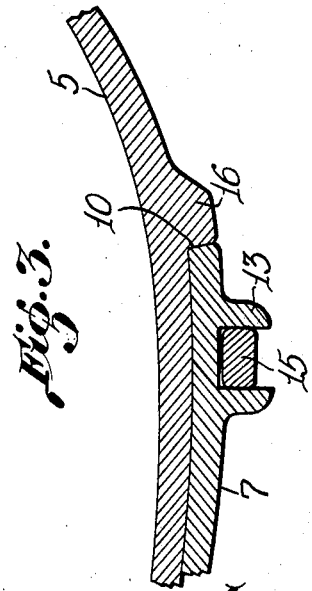
Inventor:
William H. Stires
by Jack Richmond
Attorney.

Patented Aug. 19, 1941

2,253,448

UNITED STATES PATENT OFFICE 2,253,448

CHAIN DREDGE BUCKET

William H. Stires, High Bridge, N. J., assignor to Taylor-Wharton Iron & Steel Company, High Bridge, N. J., a corporation of New Jersey Application September 14, 1940, Serial No. 356,837

2 Claims. (Cl. 37—141)

This invention is an improvement in chain dredge bucket and lip assemblies of the rivetless type whereby provision is made to inhibit side motion of the lip when the bucket line is operating for the purpose and with the result of eliminating conditions calculated to put shearing strain on the lip take-up fastenings.

In chain dredge buckets of this type there are sockets within the hood to receive the inside aprons of the lip and there are provisions externally of the hood and on the outside apron of the lip to receive the lip holddown bolts. When chain dredge buckets are in operation they not only move forward but also swing from side to side. This side thrust is borne partly by the holddown bolts and partly by the inside aprons. However, due to failure to keep the bolts tight, wear takes place between the interacting surfaces and looseness results.

According to the present invention the hood of the bucket is externally formed or provided with means bounding the side margins of the outside apron of the lip at the top of the hood and preferably having a wedging fit therewith to remove strain from the holddown bolts and to prevent side movement of the lip.

The nature, characteristic features and scope of the invention more readily will be understood from the following detailed description, taken in connection with the accompanying drawings, forming a part hereof, wherein—

Fig. 2 is a partial plan.

Fig. 3 is a sectional detail.

Fig. 4 is a section on line 4—4 of Fig. 3.

Figure 1:
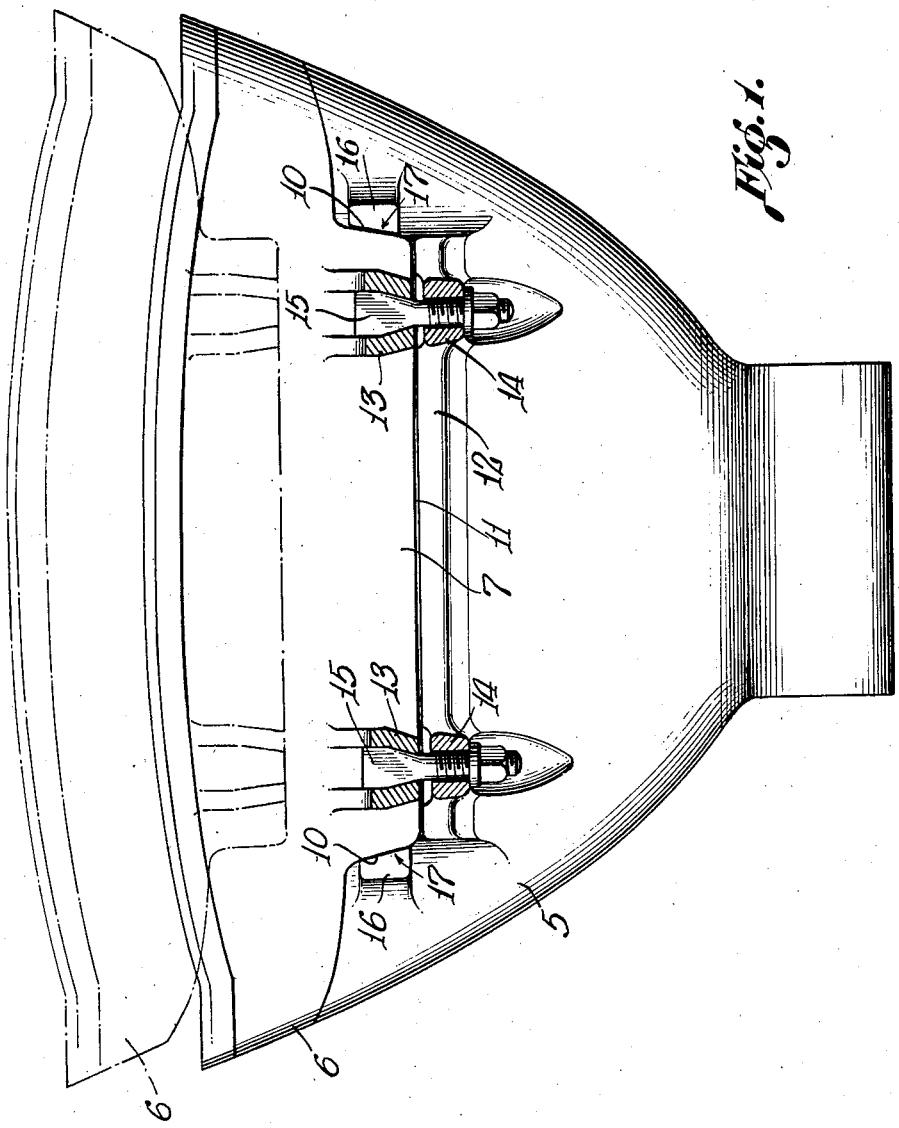
Figure 1 is an elevational view, partly in section, of a chain dredge bucket and lip assembly embodying my improvements, the lugs for the holddown bolts being broken away the better to show the take-up arrangement and the dotted lines indicating how the lip may be swung towards and away from its seat.

In the drawings, the chain dredge bucket hood is represented at 5, and at 6 is represented a swingingly mounted lip. The relative construction and arrangement of said elements may be as disclosed in my Patent No. 1,984,322, that is to say, the lip is formed or provided with a main apron 7 which fits the hood externally thereof and with aprons 8 which fit the inside walls of the hood and are socketed, as at 9, in order to secure the lip ends against converging movement when the lip is under digging stress.

The rigid main apron 7 is of generally rectangular form defined by side margins 10 and a bottom margin 11, the latter being protected by a shouldered portion of the bucket manifested as a transversely ranging abutment 12. The lip and the abutment are respectively provided with registered openings 13 and 14 for the holddown bolts 15.

As mentioned at the outset, there is side thrust on the lip when the chain of buckets is operating. In the beginning this thrust is adequately borne by the holddown bolts and by the socketed ends of the lip but as operation proceeds, the amount of relative movement is progressively increased by wear to a degree that shearing strain is put on the bolts. Hence, in the furtherance of my inventive thought, I provide positive means for inhibiting side movement of the lip when the dredge is operating. Such means preferably embodies abutments flanking the wings or side margins of the lip 7, which abutments may be cast integral with the bucket or otherwise formed and secured thereto. For example, in the specific embodiment, the bucket is formed or provided with pads or lugs 16 so constructed and arranged as to have a close fit with the side margins 10 of the lip 7. In the preferred construction the proximate walls of the lip and the side abutments are inclined, as indicated at 17. The effect of this is to insure a binding fit or wedging action particularly when the take-up devices are tightened. It will be apparent that the side lugs or abutments 16 along with the transverse rib or abutment 12 constitute, as it were, a pocket which is effective to inhibit wobbling and any other action tending to dangerous increase of side movement of the lip.

Having described the invention, I claim:

1. In a chain dredge and lip assembly of the rivetless type in which relative movement of the bucket and lip is restrained by engagement of the lip ends with complemental recesses inside the bucket and by vertical holddown bolts externally of the bucket, the combination with said elements of a transversely ranging rib and spaced apart vertically ranging abutments, said transverse rib and vertical abutments cooperating to form a confining area for an external apron extension of the lip which is effective to prevent any movement of the lip tending to place shearing strain on the holddown bolts.

2. The bucket and lip assembly defined in claim 1 further characterized in that the proximate walls of the apron and of the abutments are formed on an inclined plane to provide for a wedge fit.

WILLIAM H. STIRES.